United States Patent
Dumont et al.

(10) Patent No.: US 11,002,871 B2
(45) Date of Patent: May 11, 2021

(54) METHOD AND SYSTEM FOR PROCESSING SONIC DATA ACQUIRED WITH A DOWNHOLE TOOL

(71) Applicant: Schlumberger Technology Corporation, Sugar Land, TX (US)

(72) Inventors: Alain Dumont, Sagamihara (JP); Ayaka Abe, Stanford, CA (US)

(73) Assignee: SCHLUMBERGER TECHNOLOGY CORPORATION, Sugar Land, TX (US)

(*) Notice: Subject to any disclaimer, the term of this patent is extended or adjusted under 35 U.S.C. 154(b) by 435 days.

(21) Appl. No.: 15/672,414

(22) Filed: Aug. 9, 2017

(65) Prior Publication Data
US 2018/0045845 A1 Feb. 15, 2018

Related U.S. Application Data

(60) Provisional application No. 62/372,849, filed on Aug. 10, 2016.

(51) Int. Cl.
*G01V 1/50* (2006.01)
*G01V 1/46* (2006.01)
*G01V 1/48* (2006.01)

(52) U.S. Cl.
CPC .............. *G01V 1/50* (2013.01); *G01V 1/46* (2013.01); *G01V 1/48* (2013.01); *G01V 2210/3246* (2013.01); *G01V 2210/44* (2013.01); *G01V 2210/47* (2013.01)

(58) Field of Classification Search
CPC ... G01V 1/50; G01V 1/46; G01V 1/48; G01V 2210/44; G01V 2210/3246; G01V 2210/47
USPC .......................................................... 367/43
See application file for complete search history.

(56) References Cited

U.S. PATENT DOCUMENTS

| | | | |
|---|---|---|---|
| 6,308,137 B1 | 10/2001 | Underhill et al. | |
| 6,474,439 B1 | 11/2002 | Hoyle et al. | |
| 6,631,327 B2* | 10/2003 | Hsu ........................ | G01V 1/284 340/854.4 |
| 7,089,119 B2* | 8/2006 | Mandal .................... | G01V 1/48 367/45 |
| 7,660,200 B2* | 2/2010 | Tang ....................... | G01V 1/364 367/43 |
| 8,861,307 B2 | 10/2014 | Pabon | |

OTHER PUBLICATIONS

Breton et al., "Well Positioned Seismic Measurements," Oilfield Review, pp. 32-45, Spring, 2002.

* cited by examiner

*Primary Examiner* — Daniel L Murphy

(57) ABSTRACT

A method for processing sonic data acquired with a downhole sonic tool is provided. The method comprises detecting coherent noise based on a plurality of waveforms obtained from one or more receivers issued by one or more transmitters. The plurality of waveforms correspond to propagating acoustic waves in a formation. In addition, the method comprises building a slowness filter for removing the coherent noise, and applying the slowness filter to the plurality of waveforms.

12 Claims, 12 Drawing Sheets

METHOD AND SYSTEM FOR PROCESSING SONIC DATA ACQUIRED WITH A DOWNHOLE TOOL

CROSS-REFERENCE TO RELATED APPLICATIONS

This application is based upon and claims the benefit of the priority of U.S. Provisional Application Ser. No. 62/372,849 entitled "Method and System for Processing Sonic Data Acquired with A Downhole Tool" filed on Aug. 10, 2016, the disclosure of which is incorporated herein in its entirety by reference thereto.

BACKGROUND

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art. The following descriptions and examples are not admitted to be prior art by virtue of their inclusion in this section.

The present disclosure relates generally to sonic data processing. In particular, the present disclosure relates to methods and systems of processing sonic data acquired with WL (Wireline), LWD (logging-while-drilling) or MWD (measurements while drilling) tools for various measurements in the oil/gas industry.

In drilling or logging applications, acoustic measurements can be used to measure characteristics of the surrounding formation. Acoustic measurement techniques generally involve sensing acoustic waves generated by one or more acoustic sources and having propagated through a geological formation, for example, as described in U.S. Pat. No. 8,861,307 which is incorporated herein by reference in its entirety. The sensed propagating signals can include one or more signal components, or modes, such as shear waves, compressional waves, flexural waves, Stoneley waves, etc. Furthermore, such signal components/modes may be up-going in which propagation is in a direct, upward direction, or down-going in which propagation is in a reflected, downward direction. In at least some drilling or logging applications, the dispersion characteristics of the sensed propagating signals and/or their associated components/modes, such as attenuation, wavenumber, group delay, phase delay, etc., form a set of one or more parameters that can be used to characterize the formation.

Also, at least some drilling or logging applications process the sonic data of sensed propagating signals and/or their associated components/modes acquired by using a dipole acoustic source to detect borehole flexural mode, as described in U.S. Pat. No. 6,474,439, which is incorporated herein by reference in its entirety. However, the borehole flexural mode can be much less energetic and be easily affected by tool arrivals that are propagating modes of acoustic signals in the downhole tool. Accordingly, it is desired to measure the borehole flexural mode without an influence of the collar arrival. In addition to the tool arrivals for the borehole flexural mode measurements, in general, it is also desired to measure the signals without any influence of any other unwanted coherent noise (e.g. leaky modes for the borehole quadrupole mode measurements).

SUMMARY OF THE DISCLOSURE

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect of the present disclosure, a method for processing sonic data acquired with a downhole tool comprises detecting collar arrivals or other unwanted noise arrivals (hereafter referred to as coherent noise) based on a plurality of waveforms obtained from one or more receivers. The plurality of waveforms correspond to propagating acoustic waves in a formation. Other components of the method include building a slowness filter for removing the coherent noise and applying the slowness filter to the plurality of waveforms.

In the method of the disclosure herein, the slowness filter may be designed by creating a new set of waveforms which have a phase delay corresponding to a target slowness to be removed, then subtracting the above new set of waveforms from the original waveforms. The propagating components to be removed are either dispersive or non-dispersive arrivals.

In the method of the disclosure herein, an example of the slowness filter design may be constructed by the following:

A waveform W (z2,t) measured versus time t at a receiver far from the transmitter (at a distance z2) is a delayed version of the waveforms at a nearer receiver (at the distance z1); the delay $\Delta t$ divided by the distance between the receivers is the slowness S of the wave;

$$S=\Delta t/(z2-z1); \Delta t=S \cdot (z2-z1); W(z2,t)=W(z1,t-\Delta t)$$

The input of the target slowness S (aimed to be removed) allows predicting W2 from W1, i.e., the prediction $W2_{predicted}$ is a delayed version of the measured W1:

$$W_{predicted}(z2,t)=W(z1,t-\Delta t)$$

In practice, for digitized waveforms, the delay $\Delta t$ is not an integer number of samples. W1 must be interpolated; this is done with an interpolation filter F:

$$W_{predicted}(z2,t)=W(z1,t)*F(\Delta t)$$

where [*] is a convolution process and dispersive or non-dispersive phase delay can be manipulated. The filter F can be seen as a model of the propagating wave: knowing the waveform at a distance z1, F can predict the waveform at position z2.

In the method of the disclosure herein, an example of the above designed filter may be applied to the original waveforms as follows:

The subtraction of the measured and predicted waveforms will remove the component that propagates at slowness S. This action is called Slowness Filtering.

$$W_{filtered}(z2, t) = W(z2, t) - W_{predicted}(z2, t)$$
$$= W(z2, t) - W(z1, t) * F(\Delta t)$$

This can of course be applied to all the N waveforms of a receiver array, then shifting the resulting N−1 waveforms to start at z(1):

$$W_{filtered}(z(n+1),t) = W(z(n+1),t)W(z(n),t)*F(\Delta t) \ |n \leq N-1$$

$$W_{filtered\ \&\ shifted}(z(n),t) = W_{filtered}(Z(n+t)) \ |n \leq N-1$$

In the method of the disclosure herein, the coherent noise may be detected by obtaining slowness-frequency components of the plurality of waveforms, and the slowness filter may be built by using a fitting for the coherent noise in a F-K (frequency-wavenumber) transform of the slowness-frequency components. In the method of the disclosure herein, the method may further comprise estimating one or more formation parameters based on the plurality of waveforms after applying the slowness filter. The method may also comprise extracting slowness-frequency components of the target signal based on the plurality of waveforms after applying the slowness filter, and estimating elastic properties of the formation. In some examples, the acoustic waves may be generated by monopole, dipole or quadrupole excitation. The downhole sonic tool may be a wireline or a logging-while-drilling (LWD) tool.

In another aspect of the present disclosures, a system for processing sonic data acquired with a downhole sonic tool comprises a memory to record waveforms of the sonic data and a processor. The processor is used to detect coherent noise based on a plurality of waveforms obtained from one or more receivers, the plurality of waveforms corresponding to propagating acoustic waves in a formation. The processor is also used to build a slowness filter for removing the coherent noise and for applying the slowness filter to the plurality of waveforms.

In the system of the disclosure herein, the coherent noise may be detected by obtaining slowness-frequency components of the plurality of waveforms and the slowness filter may be built by using a fitting for the coherent noise in a F-K (frequency-wavenumber) transform of the slowness-frequency components. The processor may be used further to estimate one or more formation parameters based on the plurality of waveforms after applying the slowness filter. The processor may be used further to extract slowness-frequency components of the target signal based on the plurality of waveforms after applying the slowness filter. In some examples, the acoustic waves are generated by monopole, dipole or quadrupole excitation. The downhole sonic tool may be a wireline (WL) or logging-while-drilling (LWD) tool.

In yet another aspect of the present disclosure, a tangible article of manufacture stores machine readable instructions which, when executed, cause a machine to at least detect coherent noise based on a plurality of waveforms obtained from one or more receivers, the plurality of waveforms corresponding to propagating acoustic waves in a formation. In addition, the machine will further build a slowness filter for removing the coherent noise and apply the slowness filter to the plurality of waveforms.

In the tangible article of manufacture of the disclosure herein, the coherent noise may be detected by obtaining slowness-frequency components of the plurality of waveforms, and the slowness filter may be built by using a fitting for the coherent noise in a F-K (frequency-wavenumber) transform of the slowness-frequency components. The machine readable instructions, when executed, may further cause the machine to estimate one or more formation parameters based on the plurality of waveforms after applying the slowness filter. In some examples, the machine readable instructions, when executed, may further direct the machine to extract slowness-frequency components of the target signal based on the plurality of waveforms after applying the slowness filter, and estimate elastic properties of the formation.

Advantages and novel features of the disclosure will be set forth in the description which follows or may be learned by those skilled in the art through reading the materials herein.

BRIEF DESCRIPTION OF THE DRAWINGS

Embodiments of a downhole apparatus and components thereof according to the disclosure herein are described with reference to the following figures. The same numbers are used throughout the figures to reference like features and components.

DETAILED DESCRIPTION

Illustrative embodiments and aspects of the present disclosure are described below. In the interest of clarity, not all features of an actual implementation are described in the specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such development effort might be complex and time-consuming, but would nevertheless be a routine undertaking for those of ordinary skill in the art having benefit of the disclosure herein.

Reference throughout the specification to "one embodiment," "an embodiment," "some embodiments," "one aspect," "an aspect," or "some aspects" means that a particular feature, structure, method, or characteristic described in connection with the embodiment or aspect is included in at least one embodiment of the present disclosure. Thus, the appearance of the phrases "in one embodiment" or "in an embodiment" or "in some embodiments" in various places throughout the specification are not necessarily all referring to the same embodiment. Furthermore, the particular features, structures, methods, or characteristics may be combined in any suitable manner in one or more embodiments. The words "including" and "having" shall have the same meaning as the word "comprising."

As used throughout the specification and claims, the term "downhole" refers to a subterranean environment, particularly in a wellbore. "Downhole tool" is used broadly to mean any tool used in a subterranean environment including, but not limited to, a logging tool, an imaging tool, an acoustic tool, a permanent monitoring tool, and a combination tool.

The signal processing systems herein may be incorporated in tool systems such as wireline logging tools, measurement-while-drilling and logging-while-drilling tools, permanent monitoring systems, sondes, among others. For purposes of this disclosure, when any one of the terms wireline, cable line, slickline or coiled tubing or conveyance is used it is understood that any of the referenced deployment means, or any other suitable equivalent means, may be used with the present disclosure without departing from the spirit and scope of the present disclosure.

Moreover, inventive aspects lie in less than all features of a single disclosed embodiment. Thus, the claims following the Detailed Description are hereby expressly incorporated into this Detailed Description, with each claim standing on its own as a separate embodiment.

Various embodiments incorporating the methods and techniques of this disclosure follow an integrated approach using conventional sonic, ultrasonic and borehole seismic to enable various kinds of measurements such as an evaluation of cement in a wellbore.

Figure 1:
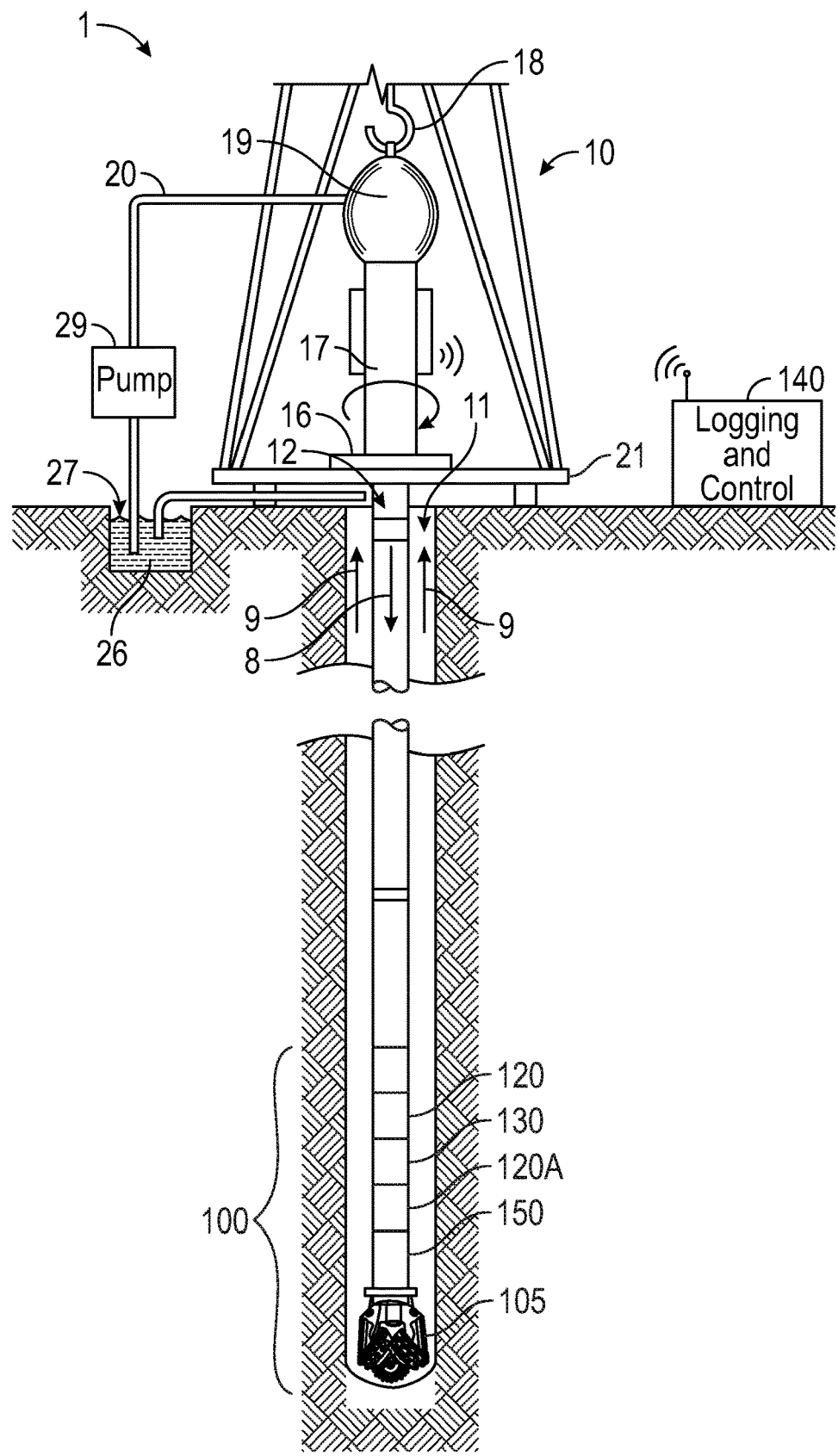
FIG. 1 is a schematic illustration of a wellsite system shown with a number of optional implementations according to embodiments of the disclosure.

Turning to the figures, FIG. 1 illustrates an example wellsite system 1 in which the example methods, apparatus and articles of manufacture described herein to perform sonic data processing can be employed. The wellsite can be onshore or offshore. In this example system, a borehole 11 is formed in subsurface formations by rotary drilling, whereas other example systems can use directional drilling.

A drillstring 12 is suspended within the borehole 11 and has a bottom hole assembly 100 that includes a drill bit 105 at its lower end. The surface system includes platform and derrick assembly 10 positioned over the borehole 11, the assembly 10 including a rotary table 16, kelly 17, hook 18 and rotary swivel 19. In an example, the drill string 12 is suspended from a lifting gear (not shown) via the hook 18, with the lifting gear being coupled to a mast (not shown) rising above the surface. An example lifting gear includes a crown block whose axis is affixed to the top of the mast, a vertically traveling block to which the hook 18 is attached, and a cable passing through the crown block and the vertically traveling block. In such an example, one end of the cable is affixed to an anchor point, whereas the other end is affixed to a winch to raise and lower the hook 18 and the drillstring 12 coupled thereto. The drillstring 12 is formed of drill pipes screwed one to another.

The drillstring 12 may be raised and lowered by turning the lifting gear with the winch. In some scenarios, drill pipe raising and lowering operations require the drillstring 12 to be unhooked temporarily from the lifting gear. In such scenarios, the drillstring 12 can be supported by blocking it with wedges in a conical recess of the rotary table 16, which is mounted on a platform 21 through which the drillstring 12 passes.

In the illustrated example, the drillstring 12 is rotated by the rotary table 16, energized by means not shown, which engages the kelly 17 at the upper end of the drillstring 12. The drillstring 12 is suspended from the hook 18, attached to a traveling block (also not shown), through the kelly 17 and the rotary swivel 19, which permits rotation of the drillstring 12 relative to the hook 18. A top drive system could be used.

In the illustrated example, the surface system further includes drilling fluid or mud 26 stored in a pit 27 formed at the well site. A pump 29 delivers the drilling fluid 26 to the interior of the drillstring 12 via a hose 20 coupled to a port in the swivel 19, causing the drilling fluid to flow downwardly through the drillstring 12 as indicated by the directional arrow 8. The drilling fluid exits the drillstring 12 via ports in the drill bit 105, and then circulates upwardly through the annulus region between the outside of the drillstring and the wall of the borehole, as indicated by the directional arrows 9. In this manner, the drilling fluid lubricates the drill bit 105 and carries formation cuttings up to the surface as it is returned to the pit 27 for recirculation.

The bottom hole assembly 100 includes one or more specially-made drill collars near the drill bit 105. Each such drill collar has one or more logging devices mounted on or in it, thereby allowing downhole drilling conditions and/or various characteristic properties of the geological formation (e.g., such as layers of rock or other material) intersected by the borehole 11 to be measured as the borehole 11 is deepened. In particular, the bottom hole assembly 100 of the illustrated example system 1 includes a logging-while-drilling (LWD) module 120, a measuring-while-drilling (MWD) module 130, a roto-steerable system and motor 150, and the drill bit 105.

The LWD module 120 is housed in a drill collar and can contain one or a plurality of logging tools. It will also be understood that more than one LWD and/or MWD module can be employed, e.g. as represented at 120A. (References, throughout, to a module at the position of 120 can mean a module at the position of 120A as well.) The LWD module 120 includes capabilities for measuring, processing, and storing information, as well as for communicating with the surface equipment. In an example implementation, the LWD module 120 includes a seismic measuring device, examples of which are illustrated in FIGS. 2A-2D and described in greater detail below. In another example implementation, the LWD module 120 includes a sonic measuring device, an example of which is illustrated in FIG. 3 and described in greater detail below.

The MWD module 130 is also housed in a drill collar and can contain one or more devices for measuring characteristics of the drillstring 12 and drill bit 105. The MWD module 130 further includes an apparatus (not shown) for generating electrical power to the downhole system. This may include a mud turbine generator powered by the flow of the drilling fluid, it being understood that other power and/or battery systems may be employed. In the illustrated example, the MWD module 130 includes one or more of the following types of measuring devices: a weight-on-bit measuring device, a torque measuring device, a vibration measuring device, a shock measuring device, a stick slip measuring device, a direction measuring device, and an inclination measuring device.

The wellsite system 1 also includes a logging and control unit 140 communicably coupled in any appropriate manner to the LWD module 120/120A and the MWD module 130. In the illustrated example, the logging and control unit 140 implements an example slowness filter processing system to process waveforms corresponding to propagating signals in a formation in accordance with the example methods, apparatus and articles of manufacture disclosed herein.

Figure 2A:
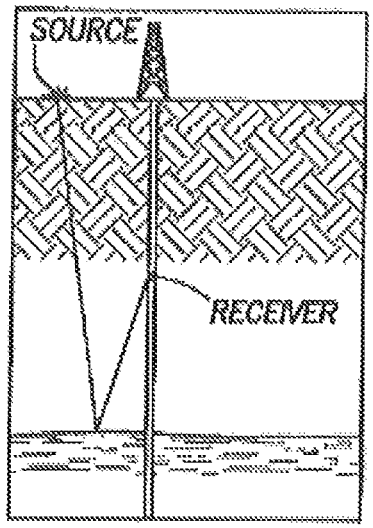
FIGS. 2A-2D illustrate example seismic-while-drilling tools according to the disclosure herein.
Figure 2B:
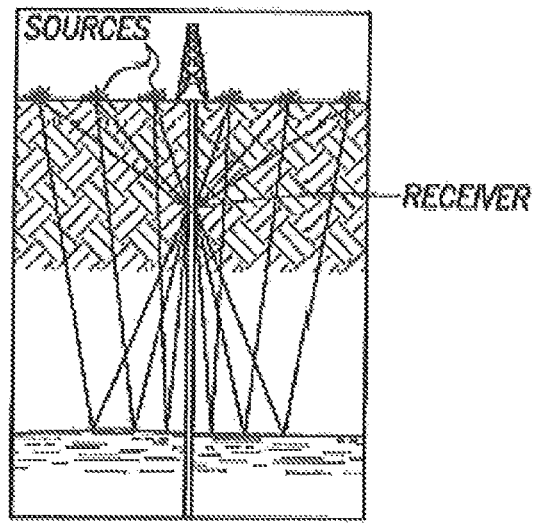
Figure 2C:
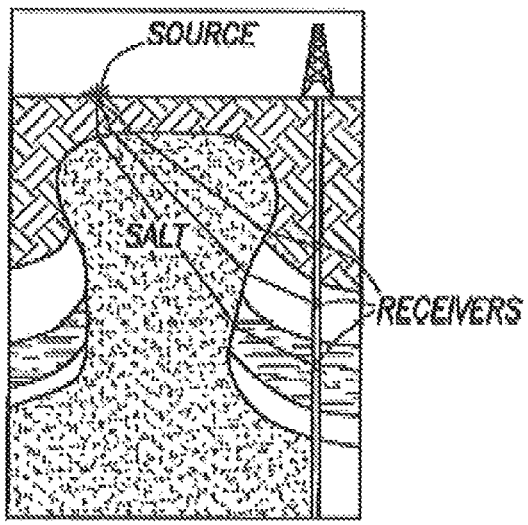
Figure 2D:
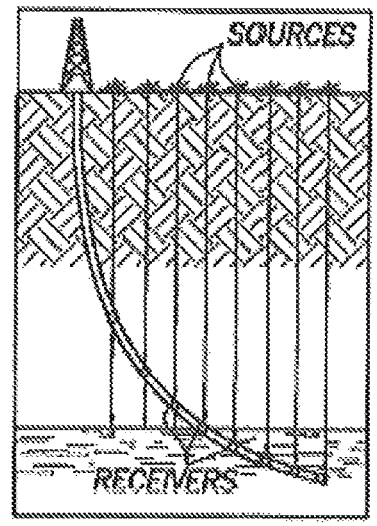
Figure 3:
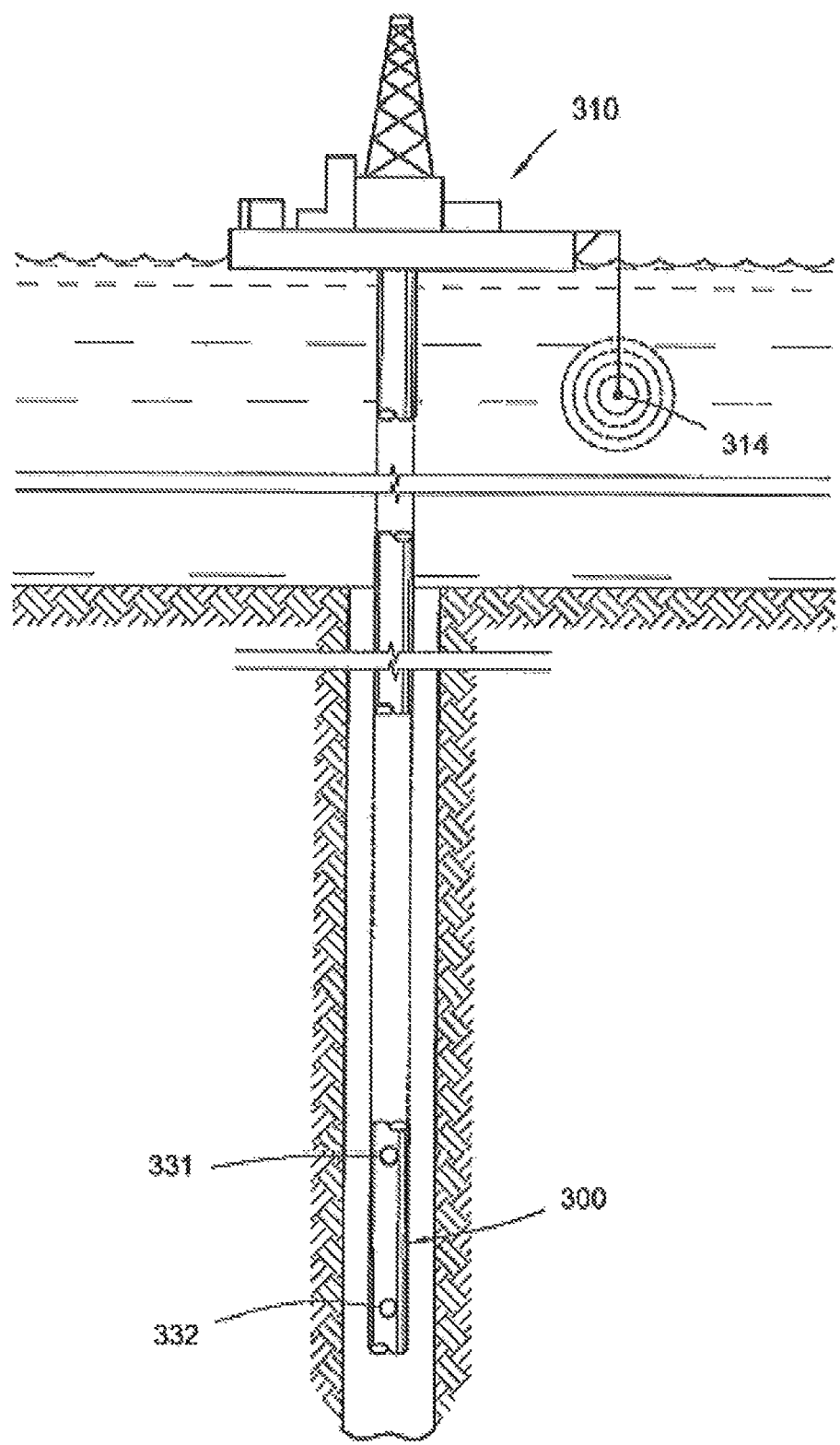
FIG. 3 illustrates one example of a sonic logging-while-drilling tool according to the disclosure herein.

FIGS. 2A-2D illustrate example seismic-while-drilling tools that can be the LWD tool 120, or can be a part of an LWD tool suite 120A of the type disclosed in P. Breton et al., "Well Positioned Seismic Measurements," Oilfield Review, pp. 32-45, Spring, 2002, incorporated herein by reference. The downhole LWD module 120/120A can have a single receiver (as depicted in FIGS. 2A and 2B), or multiple receivers (as depicted in FIGS. 2C and 2D), and can be employed in conjunction with a single seismic source at the surface (as depicted in FIGS. 2A and 2C) to support monopole acoustic logging or plural seismic sources at the surface (as depicted in FIGS. 2B and 2D) to support multipole acoustic logging.

Accordingly, FIG. 2A, which includes reflection off a bed boundary, and is called a "zero-offset" vertical seismic profile arrangement, uses a single source and a single receiver; FIG. 2B, which includes reflections off a bed boundary, and is called a "walkaway" vertical seismic profile arrangement, uses multiple sources and a single receiver; FIG. 2C, which includes refraction through salt dome boundaries, and is called a "salt proximity" vertical seismic profile, uses a single source and multiple receivers; and FIG. 2D, which includes some reflections off a bed boundary, and is called a "walk above" vertical seismic profile, uses multiple sources and multiple receivers.

FIG. 3 illustrates a sonic logging-while-drilling tool that can be the LWD tool 120, or can be a part of an LWD tool suite 120A of the type described in U.S. Pat. No. 6,308,137, incorporated herein by reference. In the illustrated example of FIG. 3, an offshore rig 310 is employed, and a sonic transmitting source or array 314 is deployed near the surface of the water. Any other suitable type of uphole or downhole source or transmitter can also be provided. An uphole processor controls the firing of the transmitter 314. The uphole equipment can also include acoustic receivers and a recorder for capturing reference signals near the source.

The uphole equipment may further include telemetry equipment for receiving MWD signals from the downhole equipment. The telemetry equipment and the recorder are coupled to a processor so that recordings may be synchronized using uphole and downhole clocks. A downhole LWD module 300 includes at least acoustic receivers 331 and 332, which are coupled to a signal processor so that recordings may be made of signals detected by the receivers in synchronization with the firing of the signal source.

Figure 4:
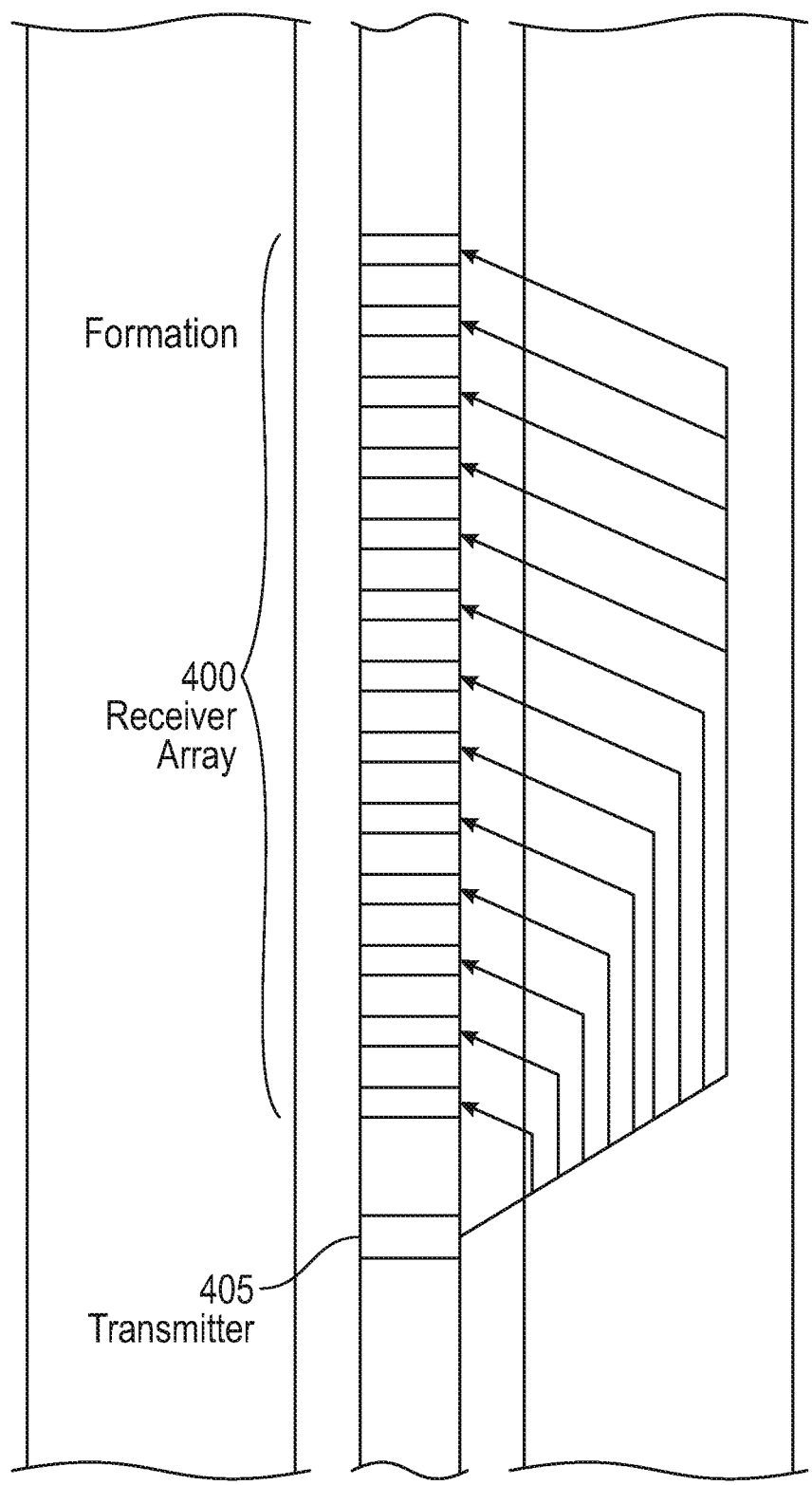
FIG. 4 illustrates one example of receiver array according to the disclosure herein.

An example receiver array 400 that may be included in the example LWD tool 120 and/or 120A of FIGS. 1, 2 and/or 3 is illustrated in FIG. 4. The receiver array 400 of the illustrated example includes an array of thirteen (13) acoustic receivers. However, a person of skill in the art would recognized that more or fewer receivers could be included in the receiver array 400. In the illustrated example, each receiver in the receiver array 400 is configured to detect acoustic waves generated by one or more acoustic sources 405 and that propagate in a formation penetrated by a borehole in which the receiver array 400 is placed.

The acoustic waveforms detected by the receivers of the receiver array 400 are staggered in time due to the spacing between the receivers. Signals detected (or sensed) by the receiver array 400 can be non-dispersive or dispersive. For non-dispersive waveforms, the waveforms determined by each receiver are substantially similar except for a time delay. For dispersive waveforms, the waveforms determined by each receiver may appear different. Examples of acoustic waveforms detected by the receiver array 400 are depicted in FIG. 5.

Figure 5:
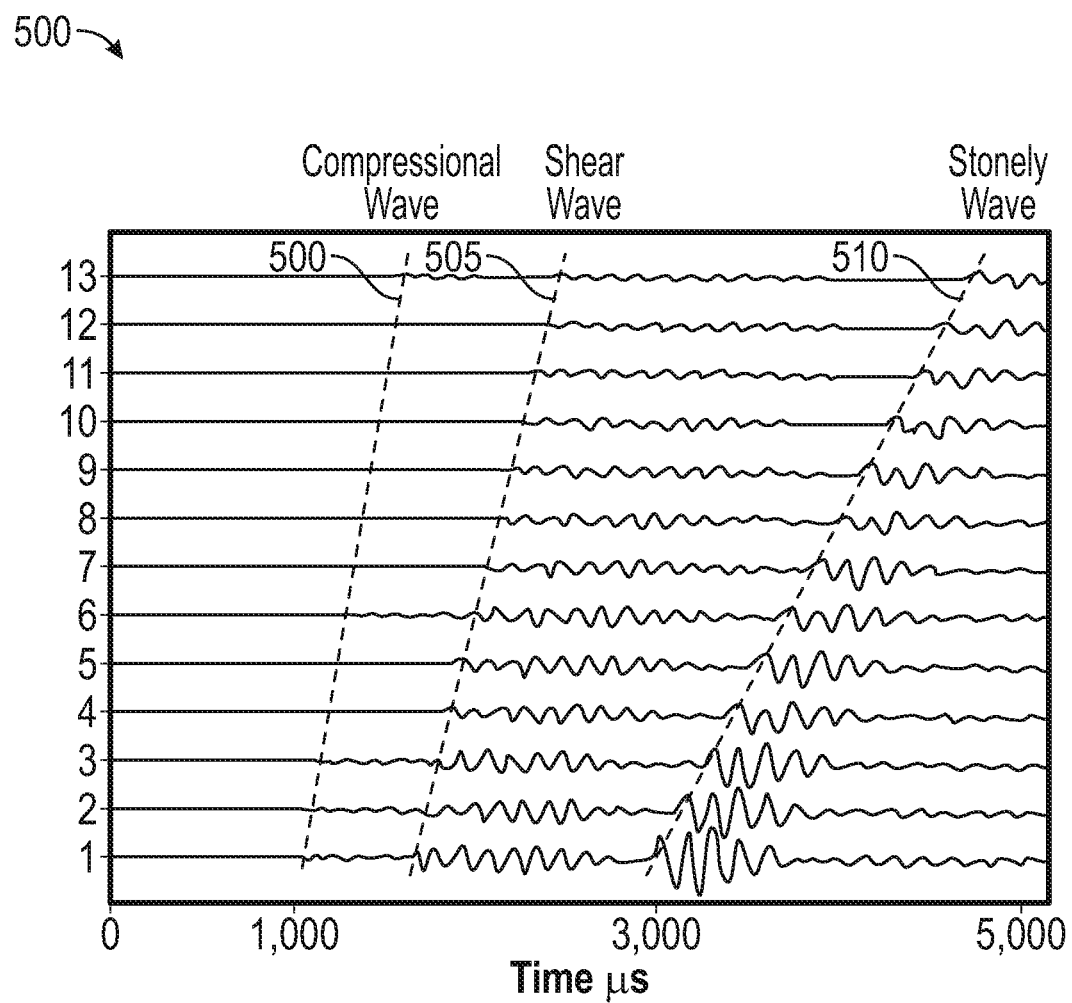
FIG. 5 depicts examples of acoustic waveforms received with the receivers according to the disclosure herein.

FIG. 5 depicts thirteen (13) example acoustic waveforms 500 corresponding respectively to the thirteen receivers included in the receiver array 400 of FIG. 4. The acoustic waveforms illustrated in FIG. 5 are offset in time relative to each other due to the effects of the cumulative spacing between the receivers in the receiver array 400. In the illustrated example, the acoustic waveforms include multiple waveform components, such as compressional waves 505, shear waves 510, and Stoneley waves 515, etc.

Figure 6:
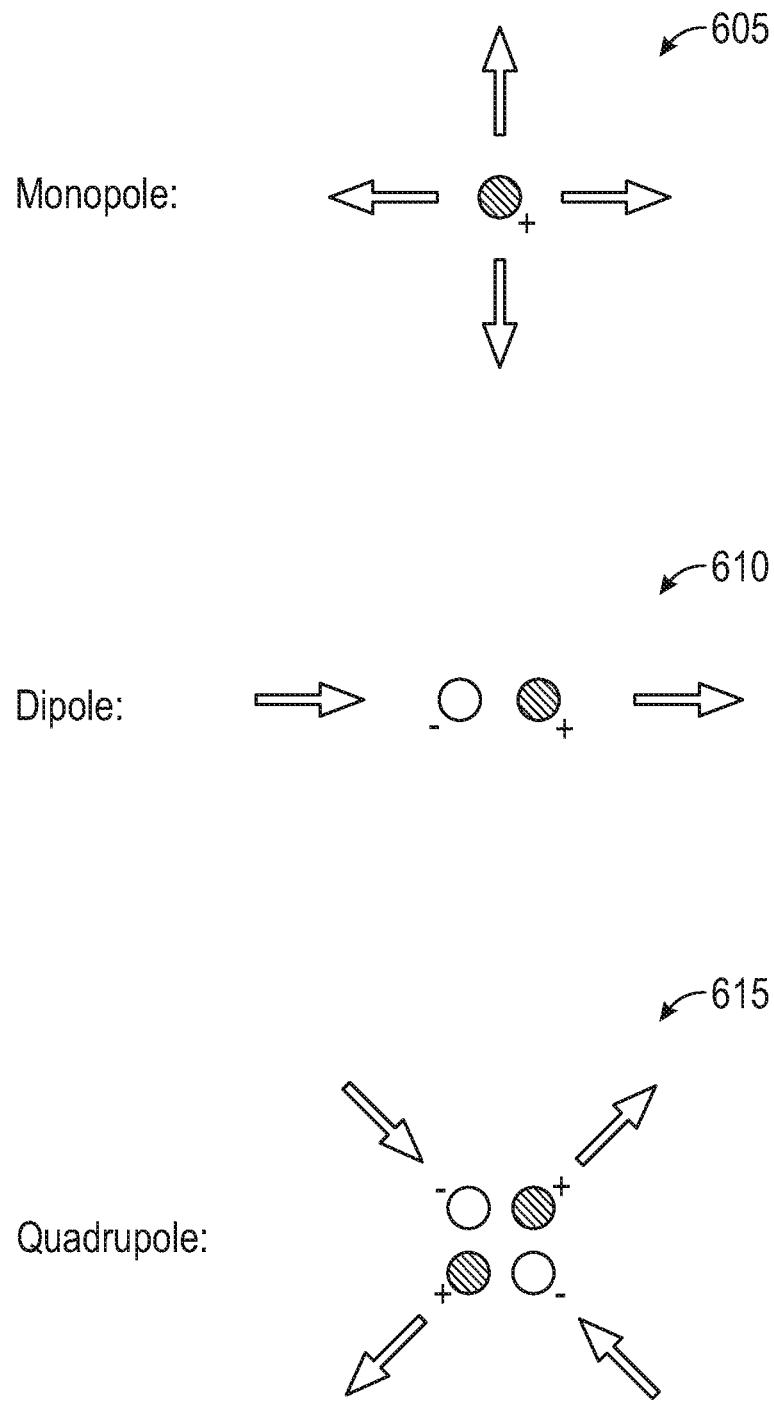
FIG. 6 illustrates examples of transducer modes of the acoustic source (transmitter) according to the disclosure herein.

FIG. 6 illustrates various example firing modes that can be employed by a transmitter, such as the transmitter 405 of FIG. 4. The three types of excitation illustrated in FIG. 6 are monopole excitation, dipole excitation and quadrupole excitation. In the case of monopole excitation, the transmitter can be modeled as a point source 605 that excites a wave that is in phase in all directions. In the case of dipole excitation, the transmitter can be modeled as two-point source 610 whose components vibrate in opposition. The resulting pressure field can be viewed as pushing on one side (corresponding to a positive direction), while pulling down on the other side (corresponding to a negative direction). The result is a directional excitation that generates directional flexural waves (hereinafter referred to also as a "borehole flexural mode") in a formation around a borehole.

The borehole flexural modes are dispersive, that is, their velocity varies with frequency, and they travel at the velocity of shear waves through the formation at low frequencies. In the case of quadrupole excitation, the transmitter can be modeled as a four-point source 615, of which two points located on the same diagonal are in phase, and the two on the other diagonal are out of phase. The quadrupole excitation generates complex quadrupole waves that are frequency dependent. To better visualize this mode, it is convenient to imagine pressing a plastic cup between two fingers in one direction, and then alternately pressing in the perpendicular direction.

Wireline logging employs an electrical cable to lower tools into the borehole and to transmit the data. In wireline logging applications, logging can be performed as the tool is pulled out of the borehole. The data is converted downhole into electronic data, which is transformed into a well log that can be analyzed, provided to a client, etc. Logging while drilling (LWD), is another logging sonic logging technique. Unlike wireline logging in which sensors are lowered into the well at the end of wireline cable, in LWD sensors are integrated into the drill string and the measurements are made while the well is being drilled. Thus, while wireline well logging occurs after the drill string is removed from the well, LWD measures geological parameters during the well drilling timeframe.

In the case of LWD, the tool operates under very severe environments (torque, shock, vibration, etc.). To support the tool in these environments, the tool has a rigid drill collar (for example, thick steel pipe), which is favorable for acoustic wave propagation. In some cases, acoustic waves such as flexural waves travel along or through the drill collar and are received at the receivers as "collar arrivals". The collar arrivals can interfere with other waves/modes and affect the measurement with the LWD tool. For example, the collar arrivals interfere with the foregoing borehole flexural mode which is much less energetic, and also distort the measurement of formation parameter such as an anisotropy of the formation using the borehole flexural mode.

Figure 7A:
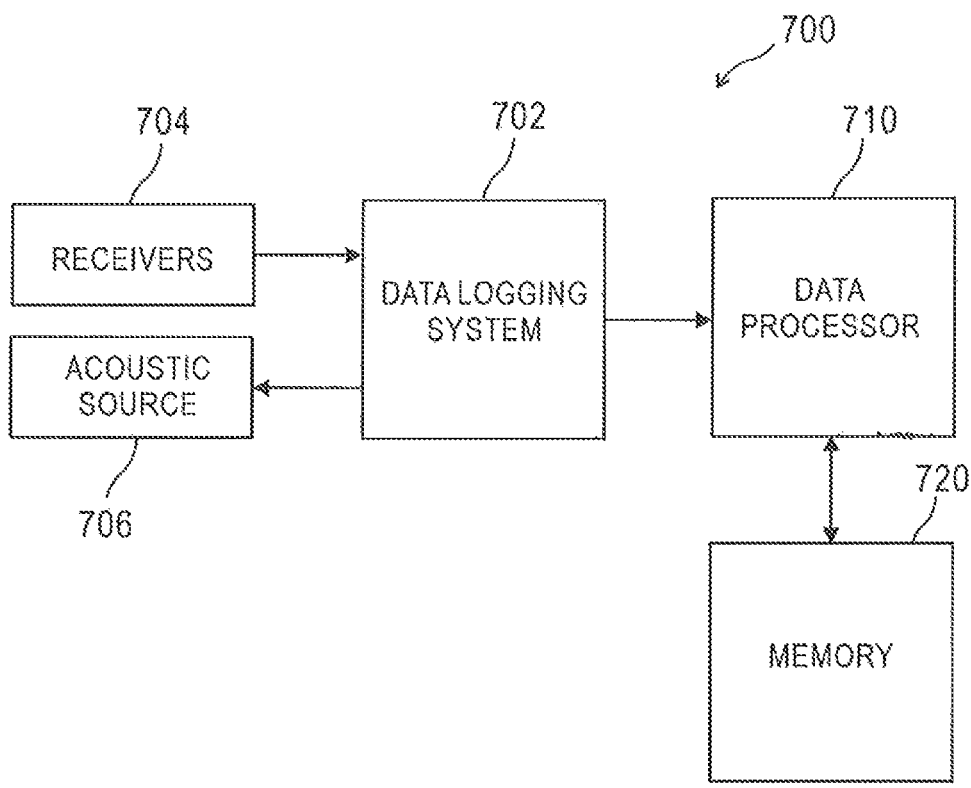
FIG. 7A shows a schematic block diagram of a formation-parameter evaluation system according to embodiments of the disclosure.

Referring to FIG. 7A, the system 700 for evaluating formation parameters such as the anisotropy of the formation may comprise a data logging system 702, acoustic receivers (vibration sensors) 704 located in the wellbore, an acoustic source 706, for generating vibrations to be received with the receivers 704, a data processor 710 such as a computer apparatus, and a memory 720. For example, the data logging system 702 may comprise one or more modules in the foregoing tool and/or tubing/cable. The receivers 704 such as the downhole array of multiple receivers or a DVS (Distributed Vibration Sensing such as a fiber optic sensor) system may be installed in the foregoing tool and coupled with the data logging system 702 via the tubing/cable.

The acoustic source 706, such as the foregoing one or more sources, may be coupled with the data logging system 702 so that the generation of vibrations can be controlled. The acoustic waves detected with the receivers 704 may be transmitted to the data logging system 702 via the tubing/cable. The data logging system 702 may produce a data log of acoustic waves (vibrations) received at the receivers 704. The data processor 710 may be coupled with the data logging system 702 via a cable or a network so as to receive the data log from the data logging system 702. The data processor 710 may be implemented by one or more circuit(s), programmable processor(s), application specific integrated circuit(s) (ASIC(s)), programmable logic device(s) (PLD(s)) and/or field programmable logic device(s) (FPLD(s)), etc.

The data log may alternatively be transferred from the data logging system 702 to the data processor 710 via a storage medium such as a USB memory, a memory card, a magnetic tape or disk, an optical disk, etc. The data processor 710 may be also installed within the data logging system 702. The sonic data, such as waveforms, are temporarily or permanently stored in the memory 720, which is a tangible computer readable medium such as a memory, digital versatile disk (DVD), compact disk (CD), etc. Software and/or firmware including instructions for processing the sonic data are also stored in the memory. The data processor 710 and the memory 720 may be configured with the processing system 1200 of FIG. 12, which is described in greater detail below.

Figure 7B:
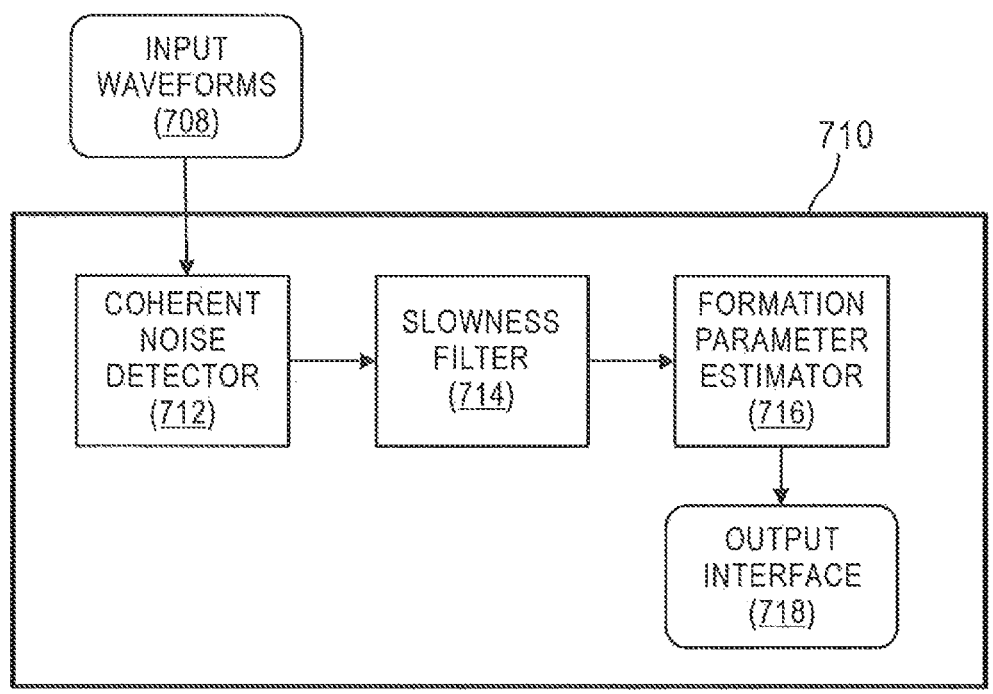
FIG. 7B is a functional block diagram of one example of the data processor in FIG. 7A.

FIG. 7B is a functional block diagram of one example of the data processor 710 in FIG. 7A. The data processor 710 may be included in or otherwise associated with the logging and control unit 140 of FIG. 1 to perform data processing of sonic data such as waveforms as disclosed herein. In some examples, at least some of the processing performed by the data processor 710 could be performed downhole (e.g., in one or more of the LWD modules 120, 120A). As noted above, although the data processor 710 is described in the context of processing logging-while-drilling acoustic data, the data processor 710 can be used to process any type of measured data, such as wireline acoustic data, borehole seismic acoustic data, surface seismic acoustic data, measured electromagnetic data, etc. In other words, the waveform data processed by the data processor 710 can correspond to any type of measured waveform data 708 derived by sensing or otherwise detecting propagating signals.

As shown in FIG. 7B, the data processor 710 includes a coherent noise detector 712 to process a set of input waveforms 708 and detect coherent noise. For example, the set of input waveforms 708 can correspond to waveforms (e.g., such as the waveforms 500) obtained by a receiver array (e.g., such as the receiver array 405) positioned to sense or otherwise receive propagating signals in a formation. The coherent noise detector 712 of the illustrated example detects or otherwise determines components of the coherent noise based on the input waveforms 708. For example, the coherent noise can be detected or measured by using an F-K (frequency-wavenumber) plane/space transformed from the waveforms 708. The coherent noise may be detected or measured by one or more of other methods such as dispersion analysis method.

The data processor 710 of FIG. 7B can include an example slowness filter 714 to build a matching slowness filter for removing the coherent noise based on the detected results of the coherent noise. For example, the slowness filter 714 determines a matching equation that fits the detected data of coherent noise on the F-K plane/space, and build the slowness filter by using the fitting equation. Then, the slowness filter 714 is applied to the waveforms 708 to isolate the target signal (e.g. borehole flexural modes). The isolated target signal is processed to extract slowness either with a non-dispersive—or a dispersive processing.

The data processor 710 of FIG. 7B can optionally include a formation parameter estimator 716 to estimate formation parameters, such as an anisotropy of the formation, attenuation, group slowness, dispersion, etc. based on the waveforms after processing by the slowness filter 714.

An example output interface 718 may be included in the data processor 710 of FIG. 7B to enable the processed waveforms, estimated formation parameters, detected formation facture information, etc., determined by the various components of the data processor 710 to be output in any appropriate format. For example, the output interface 718 can be implemented by the example interface circuit 4324 and one or more of the example output devices 4328 included in the example processing system 4300 of FIG. 12, which is described in greater detail below.

A brief review of sonic logging is provided as context for further descriptions of the coherent noise detector 712, the slowness filter 714 and the formation parameter estimator 615 included in the data processor 710. Sonic measurements can be used to evaluate formation properties. For example, a sound pulse is fired from a piezoelectric transmitter (such as the transmitter 405) and then interacts with the borehole mud and formation to generate waves with different velocities. These waves are recorded at an array of sonic receivers (such as the receiver array 400), also called hydrophones, which measure the pressure variation caused by wave propagation. The spacing between the receiver elements of the receiver array is called the R-R (Receiver-Receiver) spacing.

Figure 8:
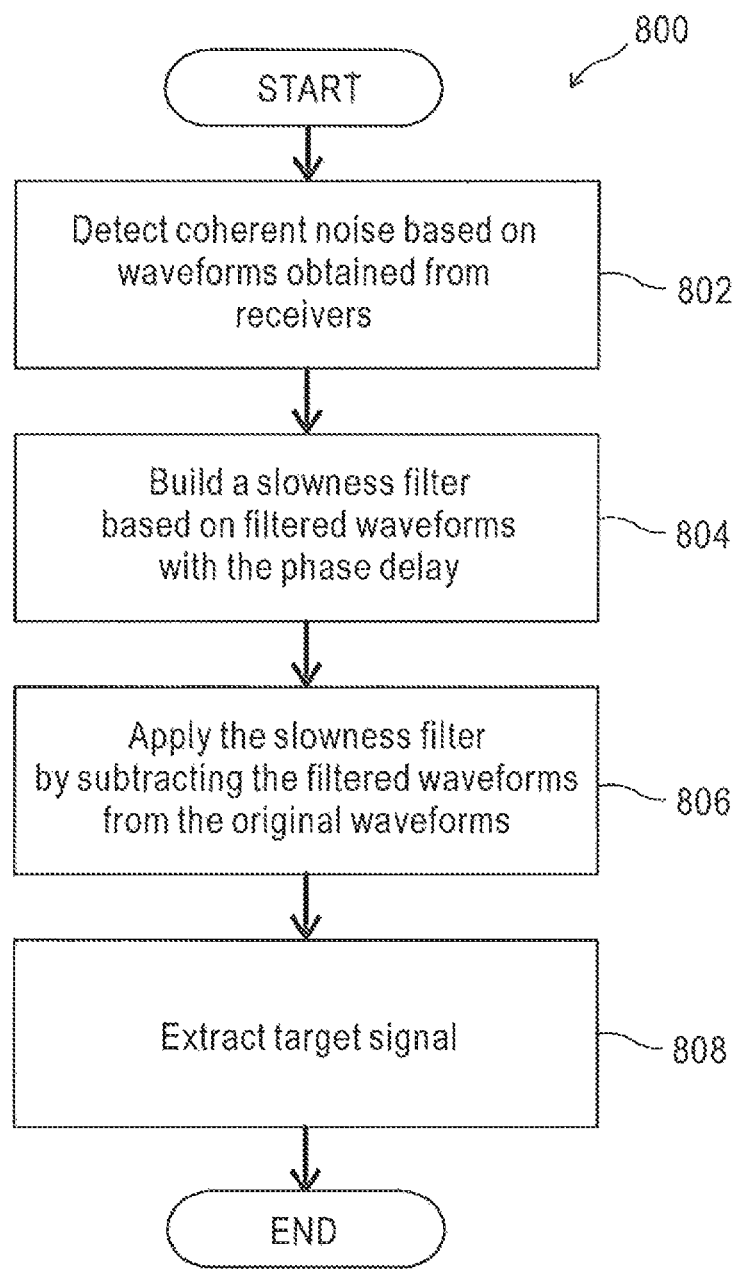
FIG. 8 is a flowchart showing one examples of sonic data processing according to the disclosure herein.

FIG. 8 is a flowchart showing one examples of sonic data processing for evaluating one or more formation parameters such as anisotropy of the formation. With reference to the preceding figures and associated descriptions, the process 800 begins execution at block 802, at which the coherence noise detector 712 detects or otherwise determines components of the coherent noise based on the input waveforms 708 obtained from the receivers.

At block 804, the slowness filter 714 is built using filtered waveforms with a phase delay for removing the coherent noise based on the detected result of coherent noise. Then, at block 806, the slowness filter 714 applies the slowness filter built at block 804 to the waveforms 708 by subtracting the filtered waveforms from the original waveforms to isolate the target signal.

At block 808, the formation parameter estimator 716 extracts slowness-frequency components of the target signal by a non-dispersive or dispersive processing. Then, the formation parameter estimator 716 optionally estimates one or more formation parameters such as an anisotropy of the formation based on the slowness-frequency components of the target signal.

Figure 9A:
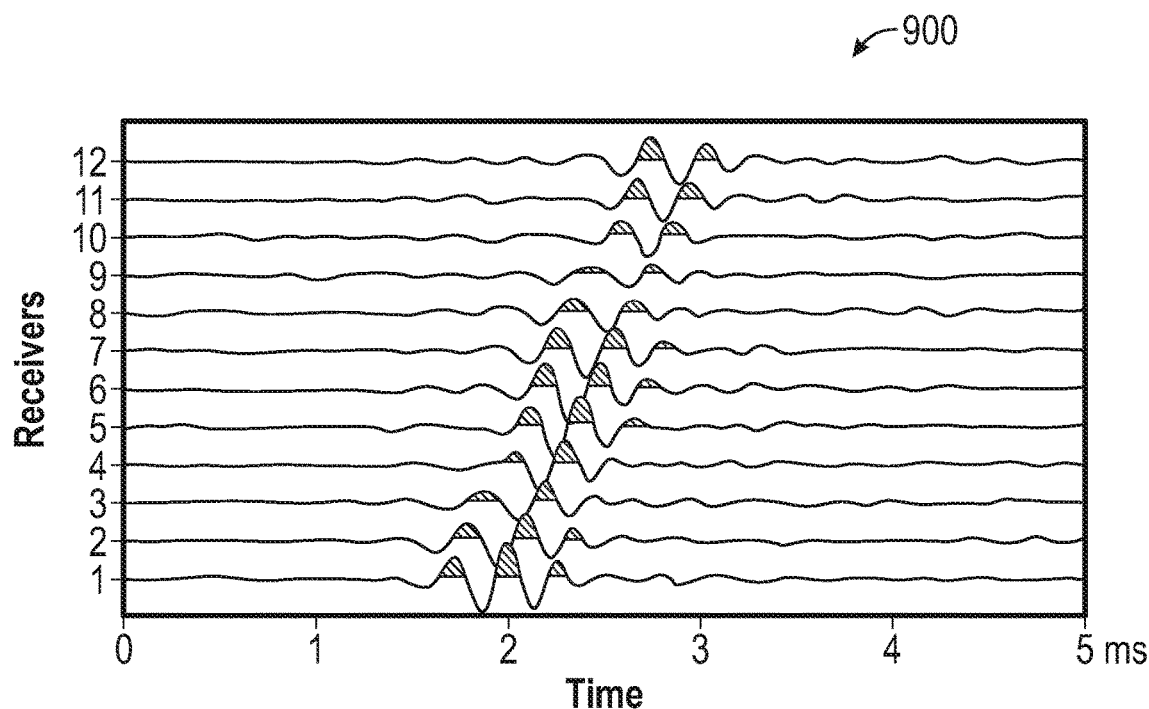
FIG. 9A shows one example of waveforms obtained with a LWD tool by dipole excitation.
Figure 9B:
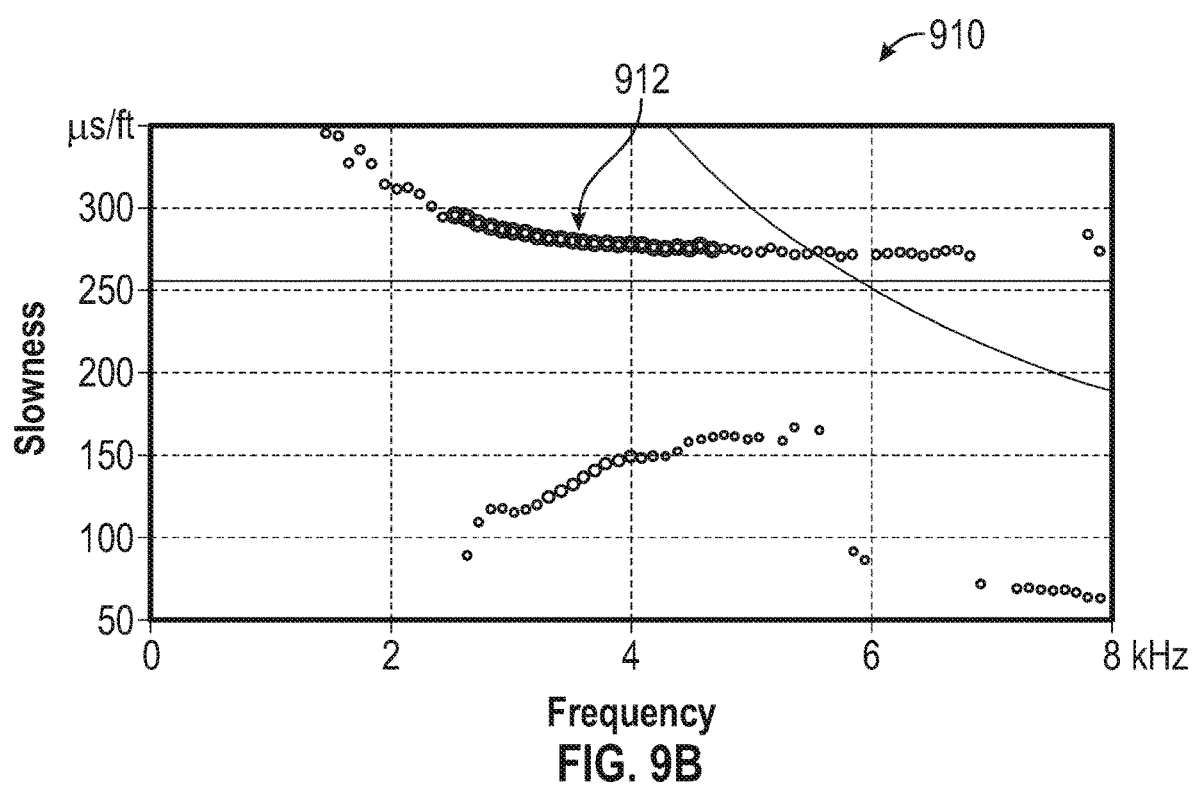
FIG. 9B shows slowness-frequency-components of the waveforms in FIG. 9A.

FIG. 9A shows one example of waveforms 900 obtained with a LWD tool by dipole excitation, and FIG. 9B shows slowness-frequency-components 910 of the waveforms in FIG. 9A. As shown in FIG. 9B, the dominant components in slowness-frequency-components are the collar arrivals 912.

Figure 10A:
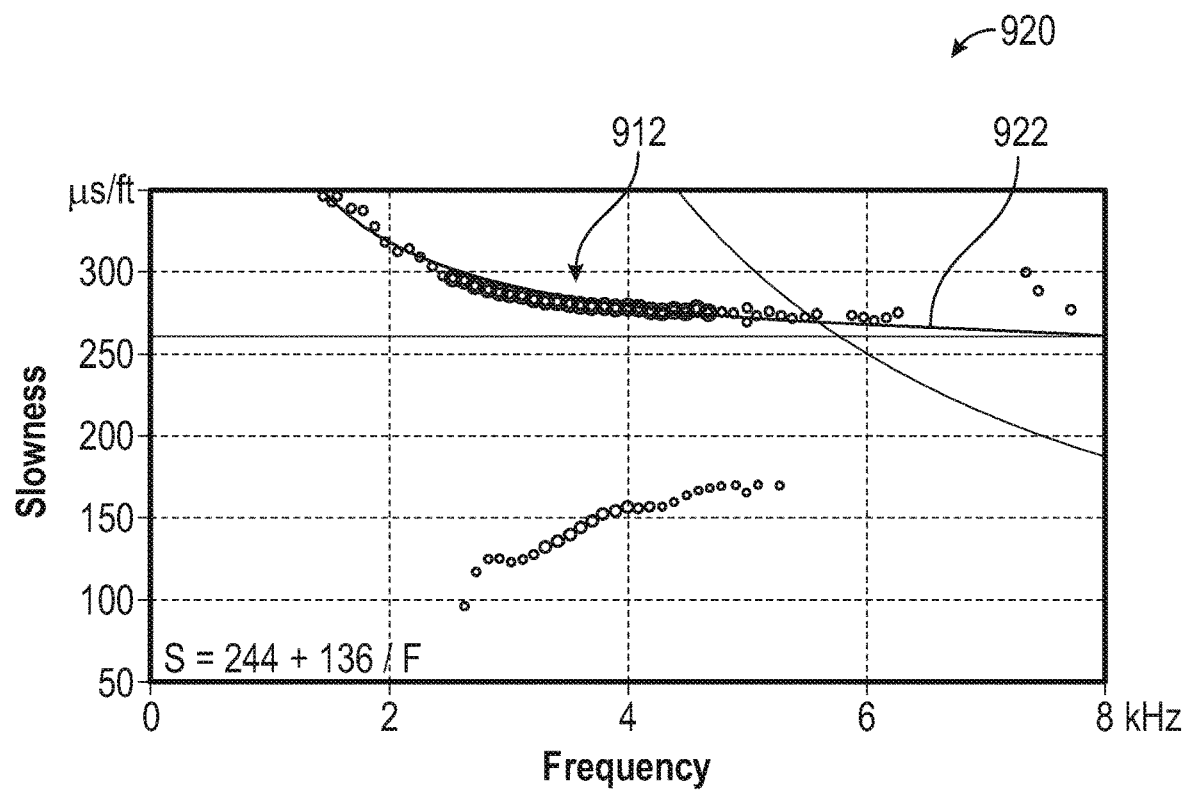
FIG. 10A shows one example of fitting to the collar arrivals in the linear scaled slowness-frequency-components.
Figure 10B:
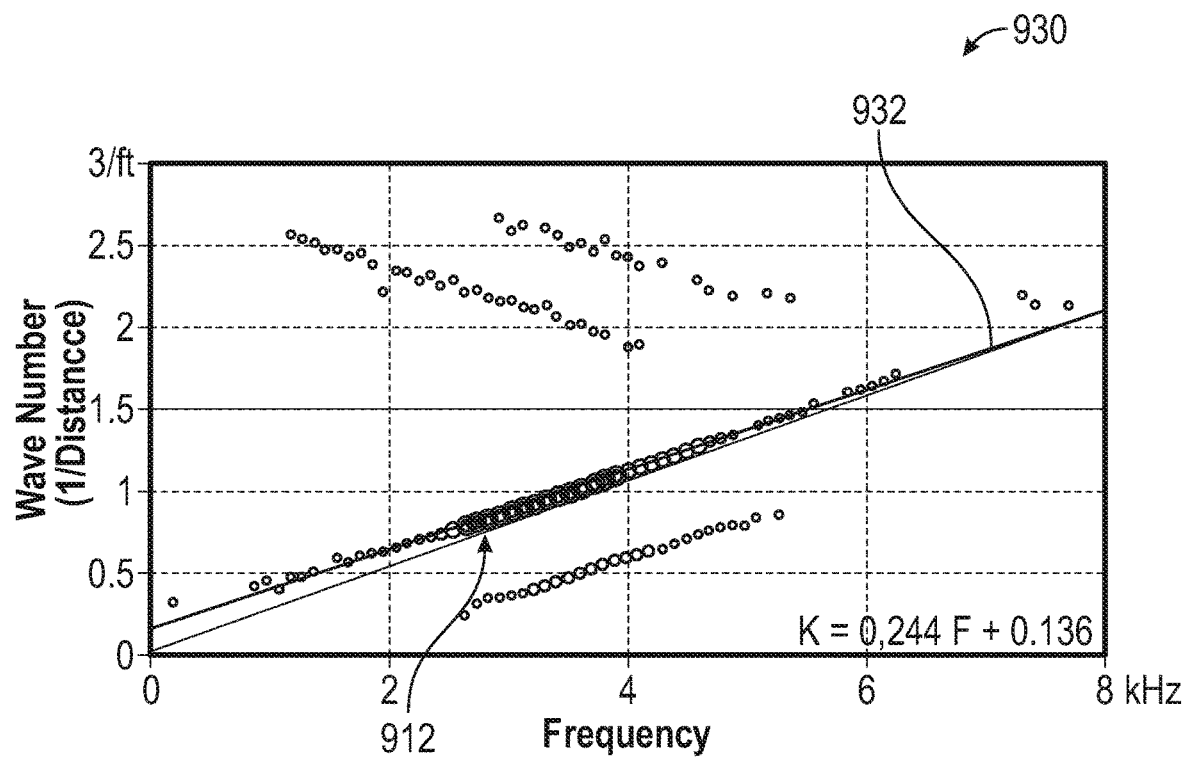
FIG. 10B shows one example of fitting to the collar arrivals in the semi-log scaled F-K space (plane)

FIG. 10A shows one example of fitting to the collar arrivals 912 in the linear scaled slowness-frequency-components 920, and FIG. 10B shows one example of fitting to the collar arrivals 912 in the F-K space (plane) 930. The shape of dispersion of the collar arrivals 912 is relatively simple and can be approximated with a hyperbola 922 in FIG. 10A. For example, the fitting hyperbola 922 in FIG. 10A is expressed with an equation of S=244+136/F, where S represents slowness [μs/ft] and F represents frequency. The hyperbola 922 is in fact a straight line 932 in the F-K space of FIG. 10B. In the present example, the F-K transform of the wave field (waveforms) is used to find its maxima and perform a least squares linear fit in the frequency range of interest. For example, the fitting straight line 932 in FIG. 10B is expressed with an equation of K=0.244F+0.136, where K represents wave number (1/distance) [/ft] and F represents frequency. By using the fitting line 932, the foregoing slowness filter can be built to isolate the borehole flexural modes from the collar arrivals.

Figure 11A:
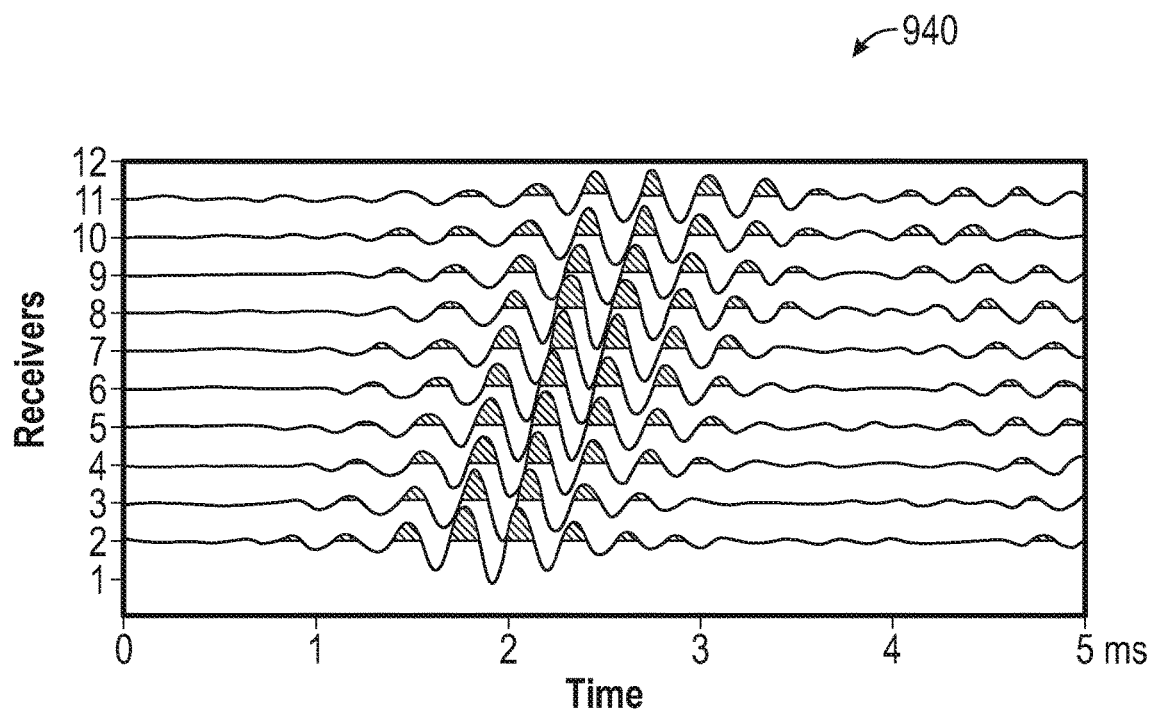
FIG. 11A shows one example of the waveforms after filtering out the collar arrivals.
Figure 11B:
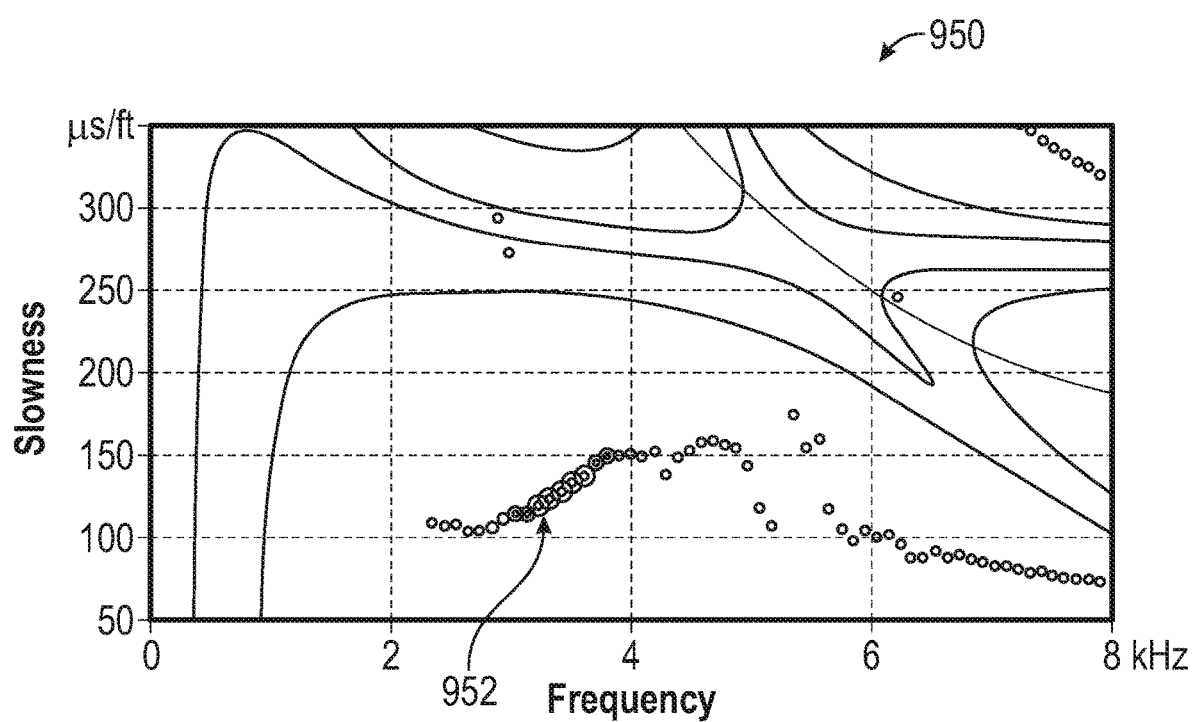
FIG. 11B shows slowness-frequency-components of the waveforms in FIG. 11A.

FIG. 11A shows one example of the waveforms 940 after filtering out the collar arrivals, and FIG. 11B shows slowness-frequency-components 950 of the waveforms in FIG. 11A. The waveforms are coherent as shown in FIG. 11A, and the borehole flexural modes 952, which are much less energetic, are now the main components of the wave field (waveforms). The waveforms after filtering are ready for further processing to estimate one or more formation parameters. For example, the variation of borehole flexural modes with respect to azimuth allows the estimation of the anisotropy of the formation.

Figure 12:
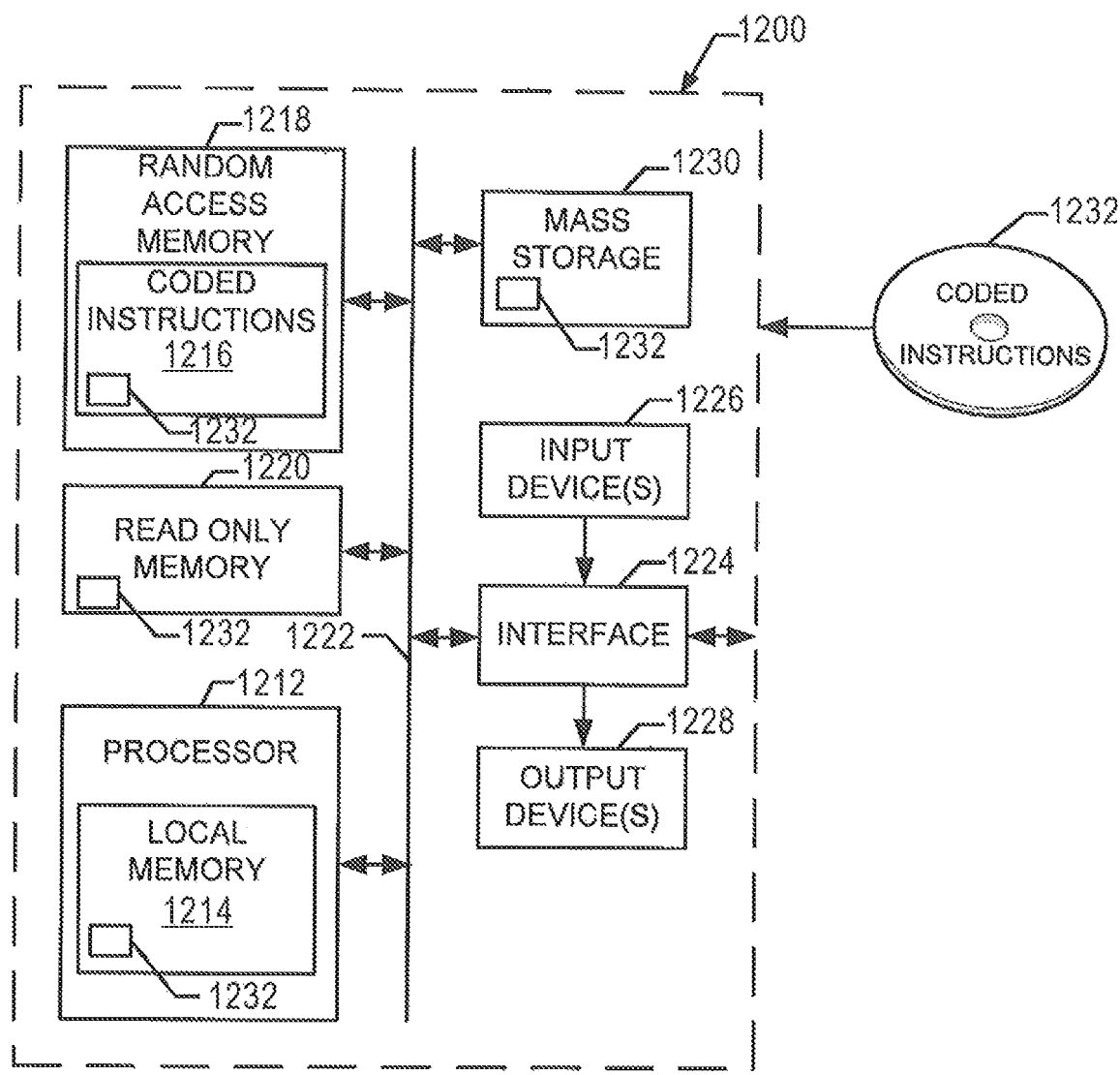
FIG. 12 is a block diagram of an example processing system that may execute example machine readable instructions used to implement some or all of the processes of FIGS. 8-11 to implement the example data processor of FIGS. 7A and 7B.

FIG. 12 is a block diagram of an example processing system 1200 capable of implementing the apparatus and methods disclosed herein. The processing system 1200 can be, for example, a server, a personal computer, a personal digital assistant (PDA), a smartphone, an Internet appliance, etc., or any other type of computing device.

The system 1200 of the instant example includes a processor 1212 such as a general purpose programmable processor. The processor 1212 includes a local memory 1214, and executes coded instructions 1216 present in the local memory 1214 and/or in another memory device. The processor 1212 may execute, among other things, machine-readable instructions to implement the processes represented in FIGS. 8-11. The processor 1212 may be any type of processing unit, such as one or more Intel® microprocessors from the Pentium® family, the Itanium® family and/or the XScale® family, one or more microcontrollers from the ARM® and/or PIC® families of microcontrollers, etc. Of course, other current and later developed processors from these and other families are also appropriate.

The processor 1212 is in communication with a main memory including a volatile memory 1218 and a non-volatile memory 1220 via a bus 1222. The volatile memory 1218 may be implemented by Static Random Access Memory (SRAM), Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1220 may be implemented by flash memory and/or any other desired type of memory device. Access to the main memory 1218, 1220 is controlled by a memory controller (not shown).

The processing system 1200 also includes an interface circuit 1224. The interface circuit 1224 may be implemented by any type of interface standard, such as an Ethernet interface, a universal serial bus (USB), and/or a third generation input/output (3GIO) interface. One or more input devices 1226 are connected to the interface circuit 1224. The input device(s) 1226 permit a user to enter data and commands into the processor 1212. The input device(s) can be implemented by, for example, a keyboard, a mouse, a touchscreen, a track-pad, a trackball, an isopoint and/or a voice recognition system.

One or more output devices 1228 are also connected to the interface circuit 1224. The output devices 1228 can be implemented, for example, by display devices (e.g., a liquid crystal display, a cathode ray tube display (CRT)), by a printer and/or by speakers. The interface circuit 1224, thus, includes a graphics driver card. The interface circuit 1224 also includes a communication device such as a modem or network interface card to facilitate exchange of data with external computers via a network (e.g., an Ethernet connection, a digital subscriber line (DSL), a telephone line, coaxial cable, a cellular telephone system, etc.).

The processing system 1200 further includes one or more mass storage devices 1230 for storing machine-readable instructions and data. Examples of such mass storage devices 1230 include floppy disk drives, hard drive disks, compact disk drives and digital versatile disk (DVD) drives. In some examples, the mass storage device 1230 may store the set of input waveforms 708. In other examples, the volatile memory 1218 may store the set of input waveforms 708.

The coded instructions 1232 for data processing in FIGS. 8-11 may be stored in the mass storage device 1230, in the volatile memory 1218, in the non-volatile memory 1220, in the local memory 1214 and/or on a removable storage medium, such as a CD or DVD 1232. As an alternative to implementing the methods and/or apparatus described herein in a system such as the processing system of FIG. 12, the methods and or apparatus described herein may be embedded in a structure such as a processor and/or an ASIC (application specific integrated circuit).

Although only a few example embodiments have been described in detail above, those skilled in the art will readily appreciate that many modifications are possible in the example embodiments without materially departing from this disclosure. Accordingly, all such modifications are intended to be included within the scope of this disclosure as defined in the following claims.

In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

According to one embodiment of this disclosure, the comparatively less expensive materials can be modified to exhibit required properties of strength and corrosion resistance sufficient to either equal or exceed current requirements for service. The preceding description has been presented only to illustrate and describe certain embodiments. It is not intended to be exhaustive or to limit the disclosures to any precise form disclosed. Many modifications and variations are possible in light of the above teaching.

The embodiments and aspects were chosen and described in order to best explain principles of the disclosures and its practical applications. The preceding description is intended to enable others skilled in the art to best utilize the principles in various embodiments and aspects and with various modifications as are suited to the particular use contemplated. It is intended that the scope of the disclosures be defined by the following claims.

What is claimed is:

1. A method to determine a parameter of a downhole formation, the method comprising:
    detecting, by executing an instruction with a processor, an acoustic collar arrival in waveform data obtained from one or more receivers disposed in a wellbore penetrating the formation, the waveform data associated with propagating acoustic waves in the wellbore and the formation, the collar arrival being acoustic waves that travel along or through a drill collar deployed in the wellbore;
    generating, by executing an instruction with the processor, a slowness filter for the collar arrival to remove the collar arrival from the waveform data, the slowness filter generated by (i) fitting the detected collar arrival with a mathematical function and (ii) processing the mathematical fitting function to compute the slowness filter;
    filtering, by executing an instruction with the processor, the waveform data using the slowness filter to generate filtered waveform data; and
    determining, by executing an instruction with the processor, the parameter of the formation based on the filtered waveform data.

2. The method according to claim 1,
    wherein detecting the collar arrival is to be based on slowness-frequency components in the waveform data, and
    wherein generating the slowness filter includes determining a fitting for the collar arrival in a F-K (frequency-wavenumber) transform of time domain waveforms.

3. The method according to claim 1,
    wherein the waveform data includes a plurality of waveforms and detecting the collar arrival is based on slowness processing of the plurality of waveforms, and
    wherein generating the slowness filter includes using the collar arrival obtained by the slowness processing.

4. The method according to claim 1, wherein the collar arrival includes dispersive coherent noise and further including generating the slowness filter for the dispersive coherent noise.

5. The method according to claim 1, wherein the waveform data is a first set of waveform data and filtering the waveform data includes:
    generating a second set of waveform data based on the slowness filter, the second set of waveform data including a phase delay corresponding to a slowness factor to be removed from the waveform data; and
    subtracting the second set of waveform data from the first set of waveform data to generate the filtered waveform data.

6. The method of claim 1, wherein the mathematical function expresses an acoustic slowness as an inverse function of frequency or a wavenumber as a linear function of frequency.

7. A tangible article of manufacture storing machine readable instructions which, when executed, cause a machine to at least:
    detect a collar arrival in waveform data obtained from one or more receivers disposed in a wellbore penetrating a downhole formation, the waveform data associated with propagating acoustic waves in the wellbore and the formation, the collar arrival being acoustic waves that travel along or through a drill collar deployed in the wellbore;
    generate a slowness filter for the collar arrival to remove the collar arrival, the slowness filter generated by (i) fitting the detected collar arrival with a mathematical function and (ii) processing the mathematical fitting function to compute the slowness filter;
    filter the waveform data using the slowness filter to generate filtered waveform data; and
    determine a parameter of the formation based on the filtered waveform data.

8. The tangible article of manufacture according to claim 7, wherein the instructions, when executed, cause the machine to:
    detect the collar arrival based on slowness-frequency components in the waveform data; and
    generate the slowness filter by determining a fitting for the collar arrival in a F-K (frequency-wavenumber) transform of time domain waveforms.

9. The tangible article of manufacture according to claim 7, wherein the waveform data includes a plurality of waveforms and the instructions, when executed, cause the machine to:
    detect the collar arrival by slowness processing of the plurality of waveforms, and generate the slowness filter using the collar arrival obtained by the slowness processing.

10. The tangible article of manufacture according to claim 7, wherein the collar arrival is dispersive and the instructions, when executed, cause the machine to generate the slowness filter for the dispersive collar arrival.

11. The tangible article of manufacture according to claim 7, wherein the waveform data is a first set of waveform data and the instructions, when executed, cause the machine to filter the waveform data by:
    generating a second set of waveform data based on the slowness filter, the second set of waveform data including a phase delay corresponding to a slowness factor to be removed from the waveform data; and
    subtracting the second set of waveform data from the first set of waveform data to generate the filtered waveform data.

12. The tangible article of manufacture of claim 7, wherein the mathematical function expresses an acoustic slowness as an inverse function of frequency or a wavenumber as a linear function of frequency.

* * * * *